United States Patent
Hagan et al.

(10) Patent No.: US 8,965,840 B2
(45) Date of Patent: *Feb. 24, 2015

(54) AUTOMATIC SYNCHRONIZATION CONFLICT RESOLUTION

(71) Applicant: Microsoft Corporation, Redmond, WA (US)

(72) Inventors: Cynthia M. Hagan, Seattle, WA (US); Brian D. Remick, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/051,172

(22) Filed: Oct. 10, 2013

(65) Prior Publication Data

US 2014/0040202 A1    Feb. 6, 2014

Related U.S. Application Data

(63) Continuation of application No. 12/715,726, filed on Mar. 2, 2010, now Pat. No. 8,572,022.

(51) Int. Cl.
  *G06F 7/00*  (2006.01)
  *G06F 17/30* (2006.01)

(52) U.S. Cl.
  CPC .... *G06F 17/30575* (2013.01); *G06F 17/30581* (2013.01); *G06F 17/30174* (2013.01); *G06F 17/30578* (2013.01)
  USPC ........... 707/608; 707/609; 707/610; 707/616; 707/638

(58) Field of Classification Search
  None
  See application file for complete search history.

(56) References Cited

U.S. PATENT DOCUMENTS

| | | | |
|---|---|---|---|
| 5,835,601 A | 11/1998 | Shimbo et al. | |
| 6,073,161 A | 6/2000 | DeBoskey et al. | |
| 6,598,059 B1 | 7/2003 | Vasudevan et al. | |
| 6,631,386 B1 | 10/2003 | Arun et al. | |
| 6,993,522 B2 | 1/2006 | Chen et al. | |

(Continued)

FOREIGN PATENT DOCUMENTS

| | | |
|---|---|---|
| CN | 101167046 | 4/2008 |
| CN | 101627581 | 1/2010 |

(Continued)

OTHER PUBLICATIONS

"EP Search Report", European Application No. 11751213.7, Oct. 7, 2013, 5 Pages.

(Continued)

*Primary Examiner* — Hung Q Pham
(74) *Attorney, Agent, or Firm* — Bryan Webster; Kate Drakos; Micky Minhas

(57) ABSTRACT

A determination is made at a first computing device of whether there is a synchronization conflict between a change to a first synchronized item at the first computing device and a change to a second synchronized item at a second computing device. If a synchronization conflict exists, rule-based conflict resolution is performed to automatically resolve the synchronization conflict. The rule-based conflict resolution is based at least in part on a type of the change made to the first synchronized item, a type of the change made to the second synchronized item, and a set of multiple rules. A notification of the resolution is then sent to the second computing device.

20 Claims, 6 Drawing Sheets

(56) References Cited

U.S. PATENT DOCUMENTS

| | | | |
|---|---|---|---|
| 7,529,780 | B1 | 5/2009 | Braginsky et al. |
| 7,533,134 | B2 | 5/2009 | Terry et al. |
| 7,606,838 | B2 | 10/2009 | Tobies |
| 7,991,740 | B2 | 8/2011 | McCarthy et al. |
| 8,572,022 | B2 | 10/2013 | Hagan et al. |
| 2003/0158852 | A1 | 8/2003 | Zoltan |
| 2004/0111390 | A1 | 6/2004 | Saito et al. |
| 2005/0044187 | A1 | 2/2005 | Jhaveri et al. |
| 2005/0050054 | A1 | 3/2005 | Clark et al. |
| 2006/0106879 | A1 | 5/2006 | Zondervan et al. |
| 2007/0282914 | A1 | 12/2007 | Sivapragasam et al. |
| 2008/0195759 | A1 | 8/2008 | Novik et al. |
| 2008/0320055 | A1 | 12/2008 | Sagar et al. |
| 2009/0327358 | A1 | 12/2009 | Lukiyanov et al. |
| 2011/0218964 | A1 | 9/2011 | Hagan et al. |

FOREIGN PATENT DOCUMENTS

| | | |
|---|---|---|
| CN | 102770854 | 11/2012 |
| WO | WO-2011109416 | 9/2011 |

OTHER PUBLICATIONS

"Extended European Search Report", EP Application No. 11751213.7, (Oct. 7, 2013), 5 pages.

"Final Office Action", U.S. Appl. No. 12/715,726, (Feb. 13, 2013), 25 pages.

"Final Office Action", U.S. Appl. No. 12/715,726, (May 2, 2012), 17 pages.

"Microsoft® Sync Framework", Available at <download.microsoft.com/.../Microsoft%20Sync%20Framework%20Datasheet.pdf>, 2 pages, (Jan. 27, 2010).

"Non-Final Office Action", U.S. Appl. No. 12/715,726, (Oct. 1, 2012), 16 pages.

"Non-Final Office Action", U.S. Appl. No. 12/715,726, (Dec. 6, 2011), 14 pages.

"Notice of Allowance", U.S. Appl. No. 12/715,726, (Jun. 25, 2013), 7 pages.

"PCT Search Report and Written Opinion", Application No. PCT/US2011/026711, (Oct. 31, 2011), 9 pages.

Bauer, Peter et al., "A Data Model Supporting Conflict Resolving in Cooperative Text Editions—HypereiDoc", *First International Conference on Networked Digital Technologies, 2009*, Available at <http://ieeexplore.ieee.org/stamp/stamp.jsp?arnumber=05272159>,(Jul. 2009), pp. 476-481.

McFedries, Paul "Networking with Microsoft Windows Vista", ISBN 0789737779, Chapter 8,(Dec. 2007), pp. 171-193.

Zhu, Haibin "Conflict Resolution with Roles in a Collaborative System", *International Journal of Intelligent Control and Systems*, vol. 10, No. 1, Available at <http://www.asmemesa.org/IJICS/files/2/2-zhu-Conflict11-20.pdf>,(Mar. 2005), pp. 11-20.

"Foreign Office Action", CN Application No. 201180011793.1, May 21, 2014, 21 Pages.

"Foreign Office Action", CN Application No. 201180011793.1, Nov. 27, 2014, 7 pages.

300

304 →

302 ↓

| | File Metadata Edit (Single Instance Value) | File Metadata Edit (Multi Instance Value) | File Metadata Edit (Automated Change) | File Content Edit | File Rename | File Delete | Parent Folder Rename | Parent Folder Delete | File Add (Same) | File Add (Different) | Subfolder Delete | Subfolder Add |
|---|---|---|---|---|---|---|---|---|---|---|---|---|
| File Metadata Edit (Single Instance Value) | 3B | 3M | 3W | 3B | 3M | 1W | N | 1O | N | N | N | N |
| File Metadata Edit (Multi Instance Value) | 3M | 3M | 3W | 3B | 3M | 1W | N | 1O | N | N | N | N |
| File Metadata Edit (Automated Change) | 3S | 3S | 3W | 3S | 3S | 1W | N | 1O | N | N | N | N |
| File Content Edit | 3B | 3B | 3W | 3B | 3M | 1W | N | 1O | N | N | N | N |
| File Rename | 3M | 3M | 3W | 3M | 5W | 1W | N | 1O | N | N | N | N |
| File Delete | 1S | 1S | 1S | 1S | 1W | 4W | N | N | N | N | N | N |
| Parent Folder Rename | N | N | N | N | N | N | 5W | 1W | N | N | N | N |
| Parent Folder Delete | 1O | 1O | 1O | 1O | 1O | N | 1S | 4W | 2O | N | 4W | 2O |
| File Add (Same) | N | N | N | N | N | N | N | 2O | W | N | N | N |
| File Add (Different) | N | N | N | N | N | N | N | 2O | N | B | N | N |
| Subfolder Delete | N | N | N | N | N | N | N | 4W | N | N | 4W | N |
| Subfolder Add | N | N | N | N | N | N | N | 2O | N | N | N | M |

Fig. 3

AUTOMATIC SYNCHRONIZATION CONFLICT RESOLUTION

RELATED APPLICATIONS

This application is a continuation of U.S. patent application Ser. No. 12/715,726, filed Mar. 2, 2010, the disclosure of which is incorporated herein by reference in its entirety.

BACKGROUND

Currently, many people use multiple computers, such as their home computer, work computer, laptop computer, and so forth. When using multiple computers, situations can arise where a user desires to synchronize changes to documents across two computers. This synchronization allows changes made to a document on one of the computers to be automatically made on the other computer as well. However, this synchronization is not without its problems. One such problem is that different changes can be made to the documents on the two computers before they are able to synchronize with one another, making it difficult to determine exactly how to synchronize the documents.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a determination is made in a first computing device of whether there is a synchronization conflict between a change to a first synchronized item at the first computing device and a change to a second synchronized item at a second computing device. Rule-based conflict resolution is performed to automatically resolve the synchronization conflict. The rule-based conflict resolution is based at least in part on a type of the change made to the first synchronized item, a type of the change made to the second synchronized item, and a set of multiple rules. A notification of the resolution is sent to the second computing device.

BRIEF DESCRIPTION OF THE DRAWINGS

The same numbers are used throughout the drawings to reference like features.

FIG. 3 illustrates an example diagram identifying the results of resolving synchronization conflicts in accordance with one or more embodiments.

DETAILED DESCRIPTION

Automatic synchronization conflict resolution is discussed herein. Different items, such as files and folders, can be synchronized across multiple computing devices. Each of the multiple computing devices maintains its own local copy of the items and synchronizes changes to those items with the other computing devices. When situations arise in which there are conflicting changes to items on different computing devices, one of the computing devices becomes a resolver for the conflict. The resolver identifies the types of changes made to the items and applies a set of rules to automatically determine how to resolve the conflicting changes. The resolver then resolves the conflicting changes as determined by an appropriate rule of the set of rules, and notifies the other computing devices of the resolution.

Figure 1:
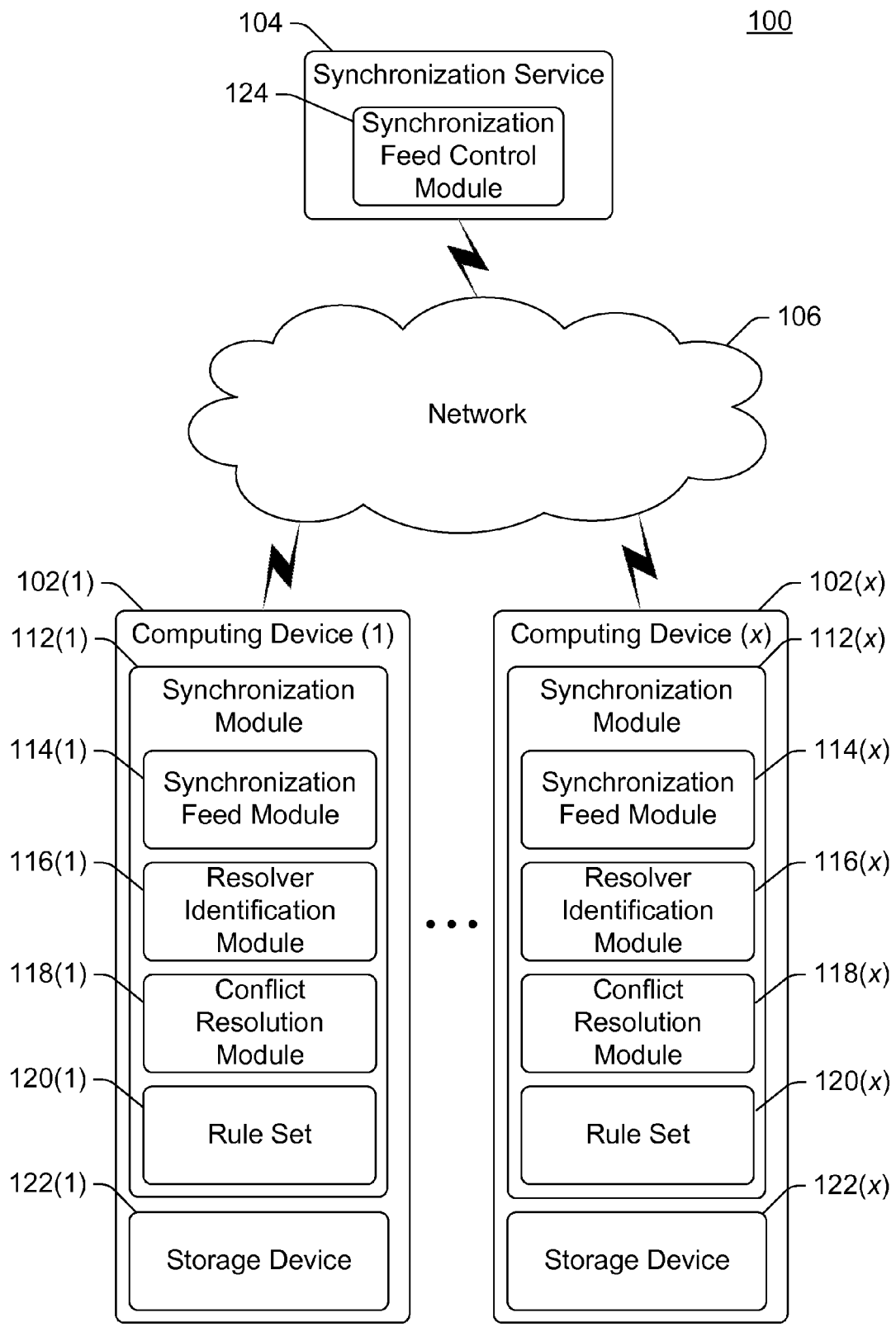
FIG. 1 illustrates an example system implementing the automatic synchronization conflict resolution in accordance with one or more embodiments.

FIG. 1 illustrates an example system 100 implementing the automatic synchronization conflict resolution in accordance with one or more embodiments. System 100 includes multiple (x) computing devices 102 that can communicate with a synchronization service 104 via a network 106. Network 106 can be a variety of different networks, including the Internet, a local area network (LAN), a public telephone network, a cellular or other wireless phone network, an intranet, other public and/or proprietary networks, combinations thereof, and so forth.

Each computing device 102 can be a variety of different types of devices. For example, a computing device 102 can be a desktop computer, a mobile station, an entertainment appliance, a set-top box communicatively coupled to a display device, a television, a cellular or other wireless phone, a personal digital assistant (PDA), a game console, an automotive computer, and so forth. Thus, each computing device 102 can range from a full resource device with substantial memory and processor resources (e.g., personal computers, game consoles) to a low-resource device with limited memory and/or processing resources (e.g., traditional set-top boxes, hand-held game consoles). Different computing devices 102 can be the same type or alternatively different types of devices.

Synchronization service 104 can be implemented using one or more of a variety of different types of computing devices. Similar to the discussion of computing device 102, service 104 can be implemented in a range of devices from a full resource device with substantial memory and processor resources to a low-resource device with limited memory and/or processing resources.

Each computing device 102 includes a synchronization module 112 having a synchronization feed module 114, a resolver identification module 116, a conflict resolution module 118, and a set of rules 120. Synchronization feed module 114 identifies changes made to local copies of items on computing device 102 and sends notifications of those changes to the other computing devices 102 having local copies of those items. Resolver identification module 116 identifies situations in which a synchronization conflict among changes to two or more copies of a synchronized item, or among changes to two or more different synchronized items, exists. A synchronization conflict (also referred to as simply a conflict) can exist when two or more copies of a synchronized item are changed in different manners on different computing devices 102. A synchronization conflict can also exist when a synchronized item that is a folder is changed and a synchronized item that is a file or other folder within that folder is also changed. A variety of different types of changes can result in synchronization conflicts, such as editing of a file, renaming of a file or folder, deletion of a file or folder, and so forth as discussed in more detail below. Each resolver identification module 116 also determines, when a synchronization conflict exists, whether the computing device 102 that includes that resolver identification module 116 is responsible for resolving the synchronization conflict.

Each conflict resolution module 118 resolves synchronization conflicts for the computing device 102 that includes that conflict resolution module 118 when that computing device 102 is responsible for resolving the synchronization conflict. The synchronization conflict is resolved automatically by the conflict resolution module 118 based on a set of rules 120 as discussed in more detail below. The resolution of the synchronization conflict is referred to as automatic because it is typically performed without any user input or user indication of how to resolve the synchronization conflict.

Each computing device 102 also has a corresponding storage device 122. Storage device 122 can be a fixed or removable storage device. In one or more embodiments, storage device 122 is included as part of computing device 102 (e.g., an internal disk drive of computing device 102). Alternatively, this storage device can be coupled to computing device 102, such as via a bus (e.g., an IEEE 1394 bus, a universal serial bus (USB), a wireless universal serial bus (wireless USB), etc.), via a local network (e.g., a LAN), and so forth. Although a single storage device 122 is illustrated in computing devices 102 of FIG. 1, it is to be appreciated that a computing device 102 can include multiple storage devices 122.

In one or more embodiments, synchronization service 104 facilitates synchronization of items across computing devices 102. Synchronization service 104 includes a synchronization feed control module 124 that receives synchronization feeds from the synchronization feed modules 114 and forwards the synchronized feeds to the other synchronization feed modules 114 of the other computing devices 102 across which items are synchronized. The synchronization feeds include information identifying changes made to synchronized items, and can also include the synchronized items themselves. In one or more embodiments, synchronization feed control module 124 stores the synchronization feeds for an amount of time, allowing the synchronization feeds to be communicated from one computing device 102 to another even though both computing devices may not be in communication with synchronization service 104 at the same time.

It should be noted that although synchronization service 104 is illustrated in FIG. 1, in other embodiments no such service need be used. For example, items can be synchronized across computing devices 102 directly via network 106 without the assistance of synchronization service 104. By way of another example, items can be synchronized across computing devices 102 by devices 102 communicating directly with one another via a wired or wireless connection and independently of network 106.

The computing devices 102 across which items are synchronized can be identified in a variety of different manners. In one or more embodiments, a user of a particular computing device 102 identifies one or more other computing devices 102 with which items are synchronized. These one or more other computing devices 102 can be identified, for example, via a user interface displayed or otherwise presented on the particular computing device 102. These computing devices 102 across which items are synchronized include, for example, other computing devices 102 that are owned and/or used by the user.

Alternatively, computing device 102 can communicate with a remote service, such as synchronization service 104, to identify possible other computing devices 102 across which items are synchronized. These possible other computing devices can be identified in different manners, such as by including computing devices that the user selects to register with synchronization service 104 for synchronization, computing devices from which the user logs into synchronization service 104, computing devices from which the user logs into synchronization service 104 using the same user credentials (such as id and password), and so forth. Synchronization service 104 maintains a record of these possible other computing devices. This record can be accessed by computing device 102, and a user interface displayed or otherwise presented by computing device 102 allowing the user to select one or more computing devices from these possible computing devices. These selected computing devices are the devices across which items are synchronized.

In other alternative embodiments, the computing devices 102 across which items are synchronized are identified in different manners. For example, items can be synchronized across all computing devices 102 from which a user logs into a remote service (such as synchronization service 104), or logs into a remote service using the same user credentials (such as id and password). By way of another example, a user can specify via a user interface presented by the synchronization service 104 when the user is logged into synchronization service 104 with a particular computing device, whether application settings are to be roamed with that particular computing device.

It should be noted that although the discussions herein include reference to items being synchronized across computing devices, items can also be synchronized across different portions of the same computing device. For example, a folder of a first user of a computing device 102 (e.g., the folder users\user1\photos) and a folder of a second user of the same computing device 102 (e.g., the folder users\user2\pictures) can both be stored on the same storage device 122 of the same computing device 102. The discussions herein referring to synchronizing items across computing devices apply analogously to synchronizing items across different portions of the same computing device.

It should also be noted that items can be synchronized across computing devices regardless of the user that is logged into the computing device. A synchronized item can be changed by different users that log into a remote service using different user credentials. The items that are identified as to be synchronized are synchronized regardless of the user that makes a change to an item.

A variety of different items can be synchronized across computing devices 102. Information or data that can be stored or otherwise maintained on storage device 122 can be items synchronized across computing devices 102. In one or more embodiments, the items synchronized across computing devices 102 include both files and folders (also referred to as directories). One or more other folders and/or files can be stored in a folder. Other types of information or data can also be items synchronized across computing devices 102, such as configuration values or settings. These other types of information or data need not be a file or folder, but can be information or data that is, for example, maintained as a data structure in memory during operation of a computing device 102. Items that are synchronized across computing devices 102 are also referred to as synchronized items.

The particular items that are synchronized can be identified in different manners. In one or more embodiments, one or more particular folders on storage device 122 are selected for synchronization. These one or more particular folders can include a default folder, and/or folders selected by a user (or other component or module of computing device 102). Files and/or other folders stored within these one or more folders are synchronized items. Alternatively, the particular items that are synchronized can be identified in other manners, such as particular files selected by a user or administrator, all files and/or folders on storage device 122, all files and/or folders in a particular partition or volume of storage device 122, and so forth.

Synchronization feed module 114 monitors synchronized items on the particular computing device 102 in which it is included to identify when a synchronized item is changed. Synchronization feed module 114 can monitor the synchronized items in a variety of different manners. For example, module 114 can maintain a record of the synchronized items, the record including, for each synchronized item, an identifier of the synchronized item, optionally a version number of the synchronized item, and a hash value of the synchronized item generated by applying a variety of different conventional hash functions to the synchronized item. Module 114 can check the synchronized items at regular or irregular intervals, checking whether one or more of the synchronized items has been changed since the last time the synchronized items were checked. This checking can be performed by, for example, generating a new hash value for the synchronized item and comparing the new hash value to the hash value for the synchronized item in the record. If the new hash value and the hash value for the synchronized item in the record are different, then a change to the synchronized item is identified.

Alternatively, rather than maintaining a record with hash values for each synchronized item, the record can include timestamps for each synchronized item. The timestamp of a synchronized item is the time when the synchronized item was last changed. The timestamp can be recorded, for example, by the application changing the synchronized item or an operating system of the computing device. Module 114 can check the synchronized items at regular or irregular intervals, checking whether one or more of the synchronized items has been changed since the last time the synchronized items were checked. This checking can be performed by, for example, comparing the current timestamp of the synchronized item to the timestamp of the synchronized item in the record. If the current timestamp of the synchronized item and the timestamp of the synchronized item in the record are different, then a change to the synchronized item is identified.

Alternatively, changes to synchronized items can be identified in different manners. For example, module 114 can be notified by another component or module (e.g., by an application making the change, by an operating system running on the same computing device as the module 114, etc.) when a synchronized item is changed.

Synchronization feed module 114 communicates, to each of the synchronization feed modules 114 of the other computing devices 102 across which items are synchronized, a notification indicating each changed synchronized item that has been identified. This indication includes the information maintained in the record by module 114 (e.g., an identifier of the synchronized item, a version number of the synchronized item, and a hash value and/or timestamp of the synchronized item). The changed synchronized item is also communicated to each of the synchronization feed modules of the other computing devices 102. Accordingly, each time a change to a synchronized item is identified by a synchronization module 112 of one computing device 102, the changed synchronized item is communicated to the synchronization modules 112 of the other computing devices 102 across which the item is synchronized. Alternatively, a synchronization module 112 can store one or more changes to one or more synchronized items for an amount of time, and this amount of time can vary. For example, this amount of time can be a particular number of minutes, a particular number of hours, an amount of time that lapses until at least a threshold number of changes have been stored, an amount of time that lapses until some other event occurs (e.g., the computing device that includes the synchronization module 112 logs into a remote service, an amount of bandwidth of the computing device that includes the synchronization module 112 or a network that the computing device is coupled to becomes free, etc.), and so forth.

In other embodiments, both the indication of the changed synchronized item and the changed synchronized item itself need not be communicated to the other computing devices 102 across which the item is synchronized. For example, just the changed synchronized item can be sent (the item itself serving as the indication of the changed synchronized item). By way of another example, the indication of the changed synchronized item can be sent, but the changed synchronized item itself not sent until requested by another computing device (e.g., requested by the computing device that is a resolver of a conflict as discussed in more detail below).

In one or more embodiments, synchronization feed module 114 maintains a history or other record of changes to synchronized items and the resolutions of conflicts, regardless of which computing device the change was made on. This history allows, for example, a user or other component or module to view and identify past changes to synchronized items that have been made and how past conflicts were resolved. This history or record can include a variety of different numbers of changes and conflict resolutions. For example, only the most recent change and conflict resolution can be maintained in the record, a larger number of changes (e.g., 100) and conflict resolutions can be maintained in the record, changes and conflict resolutions that occupy a particular amount of space (e.g., 1 Megabyte) can be maintained, and so forth.

Each computing device 102 maintains a copy of the synchronized item. Accordingly, the synchronization supported by the automatic synchronization conflict resolution discussed herein is also referred to as a multi master replication system. A copy of the synchronized item can also be, but need not be, maintained by synchronization service 104. Copies of synchronized items that lose during the conflict resolution as discussed in more detail below can also be maintained by synchronization service 104. For example, a copy of a synchronized item that is not kept according to the rules discussed in more detail below can still be maintained by synchronization service 104 (e.g., to allow a user to rollback or undue a change automatically made using the techniques discussed herein).

Synchronization conflicts can arise between two synchronized items. A synchronization conflict occurs when two or more copies of a synchronized item are changed and indications of those changes are communicated via the synchronization feed modules 114 at approximately the same time. A synchronization conflict also occurs when a synchronized item that is a folder is changed and a synchronized item that is a file or other folder within that folder is also changed, and indications of those changes are communicated via the synchronization feed modules 114 at approximately the same time. Synchronization feed module 114 determines that a conflict is present when module 114 determines, based on the indications of changed synchronized items it has received from other modules 114 as well as the changed synchronized items it has identified, that there are two or more changes to the same synchronized item (or to a synchronized item within another synchronized item) without an indication that the conflict has been resolved.

Upon receipt of an indication of a changed synchronized item for which there is no conflict, synchronization feed module 114 replaces the copy of that synchronized item in storage device 122. Synchronization feed module 114 also updates its record for the synchronized item to reflect the hash value or timestamp of the changed synchronized item. This timestamp refers to the timestamp of when the item was changed at the computing device on which the change was originally made.

As each synchronization feed module 114 is communicating indications of its changed synchronized items as well as copies of the changed synchronized items, each computing device 102 across which the items are synchronized has a copy of each of the conflicting changed synchronized items. Generally, one of the computing devices 102 across which the items are synchronized becomes the resolver for the conflict, and resolves the conflict based on a set of rules. The resolver then communicates the resolution of the conflict to the other computing devices 102 across which the items are synchronized.

When a conflict occurs, each synchronization feed module 114 identifies a default winner, which is the copy of the synchronized item that is initially identified as the copy of the synchronized item that is to be used. The default winner can be identified in a variety of different manners. In one or more embodiments, the default winner is identified as the copy of the synchronized item (or the indication of the changed synchronized item) having the most recent timestamp. Alternatively, different criteria can be used, such as the copy of the synchronized item (or the indication of the changed synchronized item) having the least recent timestamp, the synchronized item with the hash value that is the largest value, the synchronized item with the numerically smallest hash value, the synchronized item coming from the computing device 102 which has been declared a primary device (or master device, or default winning device), and so forth. Although the default winner can be identified in different manners, the different synchronization feed modules 114 typically identify the default winner so that each module 114 identifies the same winner. The copies of the synchronized items that are not the default winner are each a default loser.

The default winner is displayed or otherwise presented to the user as the correct version of the synchronized item, although this can change after applying the set of rules 120 as discussed below. The default losers are maintained separately, such as in a separate folder or portion of storage device 122. However, each computing device 102 across which the items are synchronized has a copy of each of the conflicting changed synchronized items, including the default winner and the default losers. The default losers are thus available on the computing devices 102, although are not typically displayed as being available to the users of computing devices 102. Alternatively, one or more indications of these default losers can be displayed or otherwise presented to the users of computing devices 102.

Alternatively, a default winner need not be identified to users of computing devices 102. Rather, multiple copies of the synchronized items can be displayed to the user as the correct version (but optionally with an indication that there is a conflict).

In other embodiments, the default winner can be identified in different manners by different modules (which can result in different modules identifying different default winners). However, a single computing device 102 becomes the resolver of the conflict as discussed in more detail below. Thus, the different synchronization modules 112 can represent conflicts in different manners (including identifying default winners in different manners), while a single computing device becomes the resolver for the conflict. Accordingly, the particular item that is the default winner can vary based on the computing device that becomes the resolver for the conflict.

One of the computing devices 102 across which items are synchronized becomes the resolver for the conflict. Although multiple computing devices 102 determine the copy of the synchronized item that is the default winner, just one computing device 102 becomes the resolver for the conflict. Having a single resolver for the conflict removes the possibility of a cascading set of conflicts resulting from multiple computing devices 102 resolving the conflict concurrently. The resolver for the conflict can be determined in a variety of different manners, as long as just one computing device 102 becomes the resolver for the conflict.

Although there is a single resolver for the conflict, the other computing devices 102 across which the items are synchronized attempt, at regular or irregular intervals, to become the resolver for the conflict. Such attempts continue until the conflict is resolved. Thus, if the computing device 102 that is initially the resolver of the conflict ceases to become the resolver (e.g., due to a failure of the computing device, the computing device being powered down or logged out of a remote service, etc.), another computing device 102 can become the resolver and finish resolving the conflict.

In each computing device 102, a resolver identification module 116 determines whether that computing device 102 is the resolver for the conflict. In one or more embodiments, each resolver identification module 116 attempts to write a particular value as a token indicating the module 116 is attempting to resolve the conflict. The resolver identification modules 116 use an optimistic concurrency technique to verify that if multiple resolver identification modules 116 attempt to write to that token at approximately the same time, just one of the modules 116 will succeed in writing to that token. The computing device 102 that includes the resolver identification module 116 that is successful in writing to the token is the resolver for the conflict.

Alternatively other techniques can be used to identify which computing device 102 is the resolver for the conflict. For example, a pre-defined ordering of computing devices can be followed, such as selecting the computing device with the lowest (or alternatively highest) numerical value device identifier as the resolver. By way of another example, synchronization service 104 can facilitate identifying which computing device 102 is the resolver for the conflict, such as by maintaining a token that is requested by a resolver identification module 116 in order to become the resolver for the conflict. Synchronization service 104 provides the token to only one resolver identification module 116 at a time, and does not provide the token to another module 116 until the token has been returned. The computing device 102 that includes the resolver identification module 116 that has the token is the resolver of the conflict. By way of yet another example a user selection of the one of the computing devices 102 that is to be the resolver for the conflict can be received.

Figure 2:
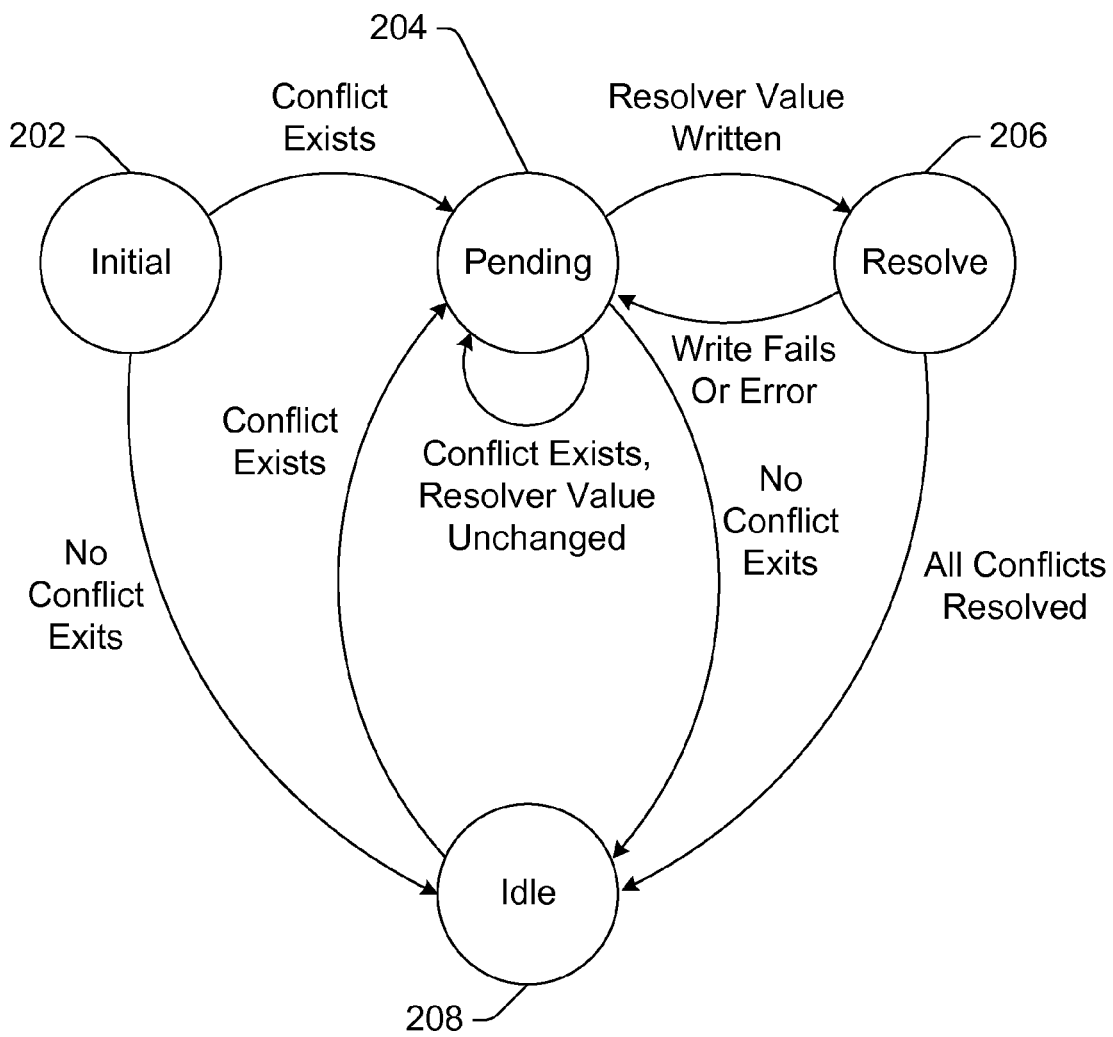
FIG. 2 is a block diagram illustrating an example state diagram used in identifying which computing device is the resolver for a synchronization conflict in accordance with one or more embodiments.

FIG. 2 is a block diagram illustrating an example state diagram 200 used in identifying which computing device is the resolver for a synchronization conflict in accordance with one or more embodiments. State diagram 200 is used by each resolver identification module (e.g., module 116 of FIG. 1). State diagram 200 includes an initial state 202, a pending state 204, a resolve state 206, and an idle state 208. With state diagram 200, the resolver identification module uses a resolver value. The resolver value is a value that can be read from and written to by the resolver identification modules of the different computing devices. This resolver value is, for example, the token value when using optimistic concurrency.

Initial state 202 is the initial state of the resolver identification module, and is the state of the resolver identification module when the resolver identification module begins running. If the synchronization feed module (e.g. module 112 of FIG. 1) determines there is a conflict, then the resolver identification module records the current resolver value and transitions to pending state 204. However, if the synchronization feed module determines there is no conflict, then the resolver identification module transitions to the idle state 208. When in idle state 208, the resolver identification module remains in idle state 208 until the synchronization feed module determines there is a conflict, at which point the resolver identification module records the current resolver value and transitions to pending state 204.

In pending state 204, the resolver identification module attempts to become the resolver of the conflict by attempting to write a new resolver value. While in pending state 204, at regular or irregular intervals, the resolver identification module also reads the current resolver value and compares the read value with the resolver value that was previously recorded. In one or more embodiments, this interval is a time $2t$, where values of t can vary (e.g., 30 seconds, one minute, one hour, five hours, etc.). If the values are the same and a conflict still exists, then the resolver identification module remains in pending state 204. However, if the values are not the same and a conflict still exists, then the resolver identification module attempts to write a new resolver value. The new resolver value that the resolver attempts to write is, for example, a combination (e.g., a concatenation) of an identifier of the computing device that includes the resolver identification module and a globally unique identifier (GUID). If the attempted write fails, then the resolver identification module remains in the pending state 204 and records the current resolver value for use in comparison after the next interval. However, if the attempted write succeeds, then the resolver identification module transitions to the resolve state 206. While in pending state 204, if a conflict no longer exists then the resolver identification module transitions to idle state 208.

When the resolver identification module is in resolve state 206, the computing device that includes that resolver identification module is the resolver of the conflict. A conflict resolution module (e.g., module 118 of FIG. 1) of the computing device resolves the conflicts based on a set of rules as discussed in more detail below. The resolver identification module remains in resolve state 206, resolving the conflicts and writing a new resolver value after each conflict is resolved, or at regular or irregular intervals. This regular or irregular interval is less than the interval at which the resolver values are compared when in pending state 204, and in one or more embodiments this interval is at time t. If the writing of the new resolver value fails, or an error is otherwise encountered, the resolver identification module records the current resolver value and transitions to pending state 204. After the conflicts are resolved the resolver identification module transitions to idle state 208.

Returning to FIG. 1, the conflict is resolved by the conflict resolution module 118 of the computing device 102 that is the resolver of the conflict. This resolution is performed based on a set of one or more rules 120. Different types of conflicts can arise, such as conflicts involving different changes to the same file, conflicts involving a change and deletion of a file, conflicts involving a change of a file and a deletion of a folder in which the file is stored, and so forth. Additionally, changes to files can be changes to the content of the file (e.g., the file data itself), or alternatively to metadata associated with the file (e.g., a play count or user rating associated with a music file).

Conflict resolution module 118 identifies the type of conflict that has arisen, and identifies a rule from the set of rules 120 that applies to that type of conflict. The identified rule specifies how the conflict is to be resolved, and conflict resolution module 118 resolves the conflict in accordance with the identified rule.

A variety of different changes to a synchronized item can potentially result in a conflict. These changes can include, for example, renaming of an item, deletion of an item, changing the content of an item, changing the metadata associated with an item, and so forth. Table I lists examples of types of changes to synchronized items that can potentially result in a conflict. It is to be appreciated that the changes in Table I are only examples, and that other types of changes can also potentially result in a conflict.

TABLE I

| Change | Description |
| --- | --- |
| File content edit | An edit to the file content or data of the file. |
| File rename | An edit to the name of a file. |
| File delete | The deletion of a file. |
| Parent folder rename | An edit to the name of a folder which contains other folders and/or files. |
| Parent folder delete | The deletion of a folder which contains other folders and/or files, and deletes all items in the folder. |
| File add (same) | The addition of two files that are the same (e.g., have the same hash values) and have the same name. |
| File add (different) | The addition of two files that are not the same (e.g., have different hash values) but have the same name. |
| Subfolder delete | The deletion of a folder that is within another (parent) folder. |
| Subfolder add | The addition of a folder to an existing folder. |
| File metadata edit (single instance value) | An edit to file metadata for which only one value is permitted (e.g., a rating of a music file). |
| File metadata edit (multi instance value) | An edit to file metadata for which multiple values are permitted (e.g., names of individuals tagged in a photo file). |
| File metadata edit (automated change) | An edit to file metadata made in an automated manner by an application (e.g., a play count value of a music file). |

Based on these different changes, a set of rules is applied to resolve a conflict. A variety of different rules can be applied. Table II lists examples of rules that can be applied to resolve a conflict. It is to be appreciated that the rules in Table II are only examples, and that other rules can alternatively be applied. In one or more embodiments, the rules in Table II are checked in their order (e.g., rule 1 first, rule 2 second, and so forth), and as soon as a rule that applies is identified that rule is used to resolve the conflict.

TABLE II

| Rule Number | Description |
| --- | --- |
| 1 | In Edit-Delete conflicts, the Edit wins. For File Edit-Folder Delete conflicts, the file and folder are kept but the only file in the folder is the file with which the conflict existed. |
| 2 | In Add-Delete conflicts, the Add wins. For File Add-Folder Delete conflicts, the file and folder are kept but the only file in the folder is the newly added file. |
| 3 | In Edit-Edit conflicts, merge the items if possible. If the items cannot be merged, keep both versions of the item unless the change was made by an automated system (in which case the change is evaluated and either both files are kept or a winner is chosen). |

TABLE II-continued

| Rule Number | Description |
|---|---|
| 4 | Conflicts that include multiple deletes result in the deletion of both items. |
| 5 | For multiple renames of an item, keep the most recent change. |
| 6 | If none of the previous rules apply, then both versions of the item are kept. |

As can be seen from the example rules in Table II, a variety of different rules can be applied to obtain a variety of different results. The results of applying a rule can be keeping one of the versions of the synchronized item (e.g., the item that wins in the rules of Table II). Merging of two synchronized items can also be the result in some situations. Merging of the two synchronized items refers to combining the changes from the two synchronized items so that the changes in both versions are kept. In one or more embodiments, conflict resolution module 118 is configured with information indicating which items can be merged and under what circumstances those items can be merged. Module 118 can be configured with this information by, for example, a developer or administrator of module 118. For example, module 118 can be configured with an indication that metadata that is a multi instance value (e.g., names of individuals tagged in photo files) can be merged together by keeping the multiple values of the instance, but metadata that is a single instance value (e.g., a rating of a music file) cannot be merged because only one value can be maintained. By way of another example, module 118 can be configured with an indication that a file rename can be merged with the editing of the file content by keeping both the renamed file and the edits to the file content.

In situations where both versions of a file (the default winner and the default loser) are kept, an indication of both versions is presented by the computing devices 102. This indication can be, for example, a particular naming convention that indicates there are two versions of the synchronized item, such as including a file named "foo.docx" and a file named "fooA.docx", or each file having a name that includes a timestamp of when the file was changed. Alternatively, indications of both versions can be displayed or otherwise presented by the computing devices 102 in different manners, such as by a dialog box indicating the conflict, a flag or other indicator of the conflict, and so forth.

Additionally, in one or more embodiments an additional component or module can be invoked by conflict resolution module 118 to assist a user in combining or selecting from both versions of a synchronized item. For example, if a conflict is changes to a word processing document, merge functionality of a word processing application can be invoked to create a merged document that can be displayed to the user. This merged document is a document that includes and identifies the changes from both versions of the synchronized item (in accordance with techniques used by the word processing application to provide the merge functionality). Similar merging or combining functionality of other applications can also be invoked.

FIG. 3 illustrates an example diagram 300 identifying the results of resolving synchronization conflicts in accordance with one or more embodiments. In diagram 300, the type of change of the default winner is shown along (vertical) axis 302, while the type of change of the default loser is shown along (horizontal) axis 304. The intersection of the two types of changes in diagram 300 is a cell that identifies whether there is a conflict, and if so what the resolution of that conflict is. The value "M" indicates that the copies of the synchronized item are merged together. The value "W" indicates that the default winner is kept and the default loser is discarded or ignored. The value "S" indicates that the default winner and default loser are swapped, resulting in what was the default loser being kept and what was the default winner being discarded or ignored. The value "B" indicates that both the default winner and the default loser are kept. The value "O" indicates that the file is orphaned, so the folder is kept but includes a single file (which is the file with which the conflict existed). The value "N" indicates there is no conflict.

A number is included in some of the cells in diagram 300. This number refers to a particular rule (from Table II discussed above) that is applied to achieve the indicated result.

As an example, considering diagram 300, if the default winner is a file delete and the default loser is a file meta data edit (single instance value), then the intersecting cell (with a value of 1S) indicates that, according to rule 1 of Table II, the edited file is kept rather than deleted. By way of another example, if the default winner is a file content edit and the default loser is a file rename, then the intersecting cell (with a value of 3M) indicates that, according to rule 3 of Table II, the items are merged together so that both the file content edits and the file renaming are kept.

It should be noted that three or more synchronized items can conflict with one another. For example, three or more copies of a particular synchronized item can be changed approximately concurrently. Such conflicts are resolved one by one, with one of the synchronized items being the default winner as discussed above, and the remaining synchronized items being default losers. The resolver then resolves the conflicts one by one, comparing the default winner to one of the default losers and resolving the conflict between those two synchronized items based on the set of rules as discussed above. It should be noted that during this process, the particular synchronized item that is the default winner can change as a result of applying one or more of the rules. The same computing device can be the resolver for the multiple conflicts of the synchronized items, or alternatively different computing devices can be the resolver for different conflicts.

It should also be noted that synchronized items can be changed by the same user or alternatively different users. Additionally, computing devices via which the changes are made can be owned or managed by different user accounts (used to log into the computing device and/or a remote service). Conflicts are resolved as discussed above regardless of whether the same or different users changed the synchronized item, and regardless of the user account that owns or manages the different computing devices.

In one or more embodiments, conflicts can be resolved at a variety of different granularities. For example, conflicts can be resolved on a per-file basis, on a per-folder basis, across multiple folders within a specified folder, and so forth. Different conflict resolution modules (e.g., modules 118 of FIG. 1) can be included on a computing device 102 to resolve conflicts at these different granularities. Accordingly, multiple different conflict resolution modules on a computing device 102 can be running concurrently to resolve conflicts for different synchronized items. Furthermore, different conflict resolution modules on different computing devices 102 can be running concurrently to concurrently resolve conflicts for different synchronized items.

Figure 4:
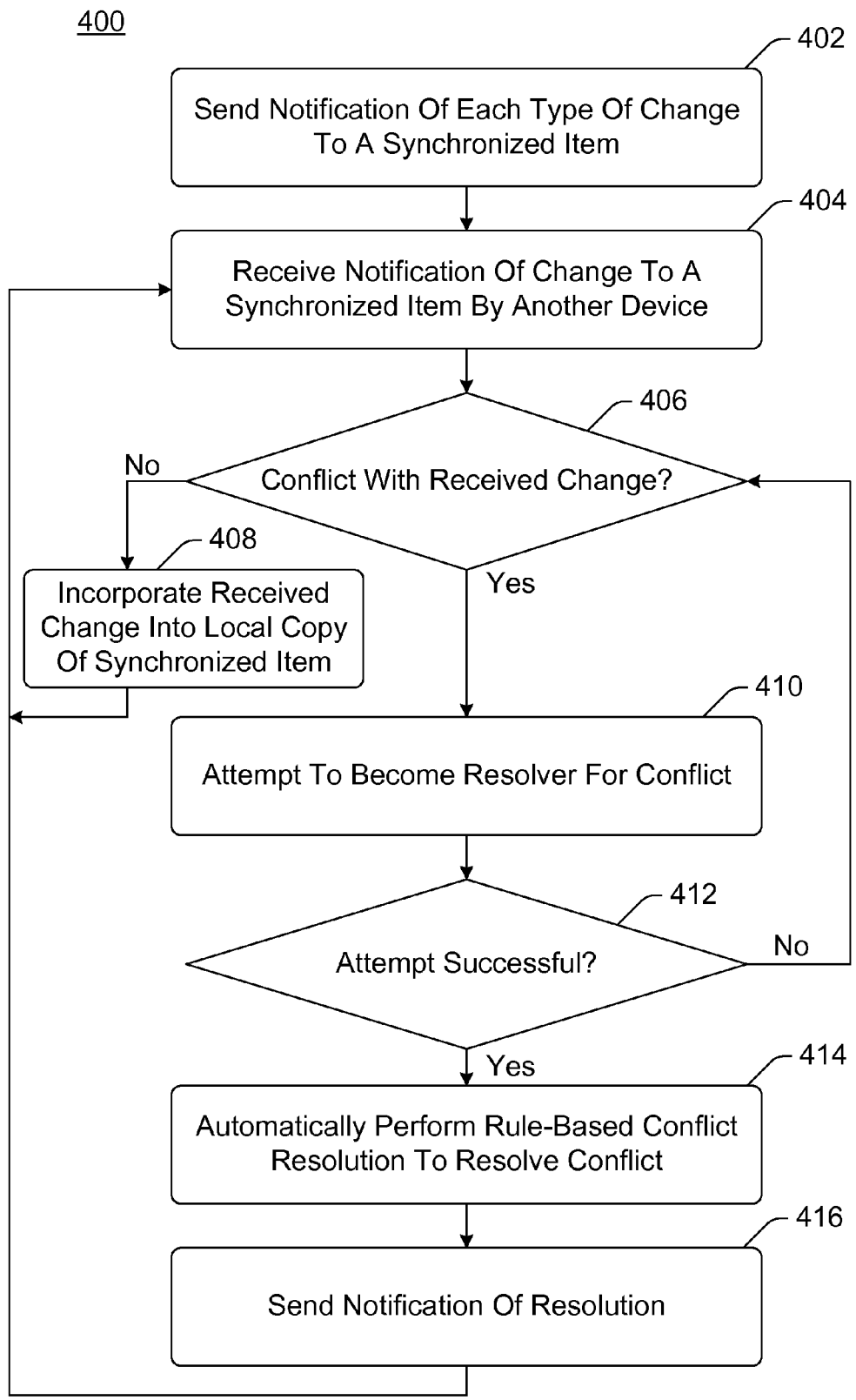
FIG. 4 is a flowchart illustrating an example process for automatic synchronization conflict resolution in accordance with one or more embodiments.

FIG. 4 is a flowchart illustrating an example process 400 for automatic synchronization conflict resolution in accordance with one or more embodiments. Process 400 is carried out by a device, such as a computing device 102 of FIG. 1, and can be implemented in software, firmware, hardware, or combinations thereof. Process 400 is shown as a set of acts and is not limited to the order shown for performing the operations of the various acts. Process 400 is an example process for automatic synchronization conflict resolution; additional discussions of automatic synchronization conflict resolution are included herein with reference to different figures.

In process 400, a notification of each type of change to a synchronized item is sent to the other computing devices (act 402). These other computing devices are the other devices across which the item is synchronized. A variety of different types of changes can be made, as discussed above.

A notification of a change to a synchronized item by another device is also received (act 404). The changed synchronized item is also received from the other device as discussed above.

A check is made as to whether there is a conflict with the received change (act 406). A conflict can arise, for example, as a result of multiple different changes of which notification was received in act 404, or as a result of a change made by the device implementing process 400 and a change of which notification was received in act 404.

If there is no conflict with the received change, then the received change is incorporated into the local copy of the synchronized item (act 408). Thus, any changes made to the synchronized item on another device are incorporated into the synchronized item on the computing device implementing process 400.

However, if there is a conflict with the received change, then the device implementing process 400 attempts to become the resolver for the conflict (act 410). The device can attempt to become the resolver for the conflict in a variety of different manners as discussed above.

Process 400 then proceeds based on a check of whether the attempt to become the resolver is successful (act 412). If the attempt to become the resolver is not successful, then process 400 returns to act 406. Eventually, the device will be successful in its attempt to become the resolver, or the conflict will no longer exist (e.g., due to another device having become the resolver and resolving the conflict).

If the attempt to become the resolver is successful, then rule-based conflict resolution is automatically performed to resolve the conflict (act 414). A variety of different rules can be applied, as discussed above.

A notification of the resolution is sent to the other computing devices (act 416). This notification can take different forms, such as sending an indication that the conflict is resolved and one or more actions the other computing devices are to take regarding a synchronized item (e.g., rename an item, delete an item, etc.), sending an indication that the conflict is resolved and a copy of the synchronized item (e.g., a merged filed) that each of the other computing devices is to store as their copy of the synchronized item, and so forth. These other computing devices are the other devices across which the item is synchronized. This notification is received by the other devices and incorporated into their local copies of the synchronized item. Process 400 then returns to act 404, where additional notifications of changes to synchronized items can be received.

Figure 5:
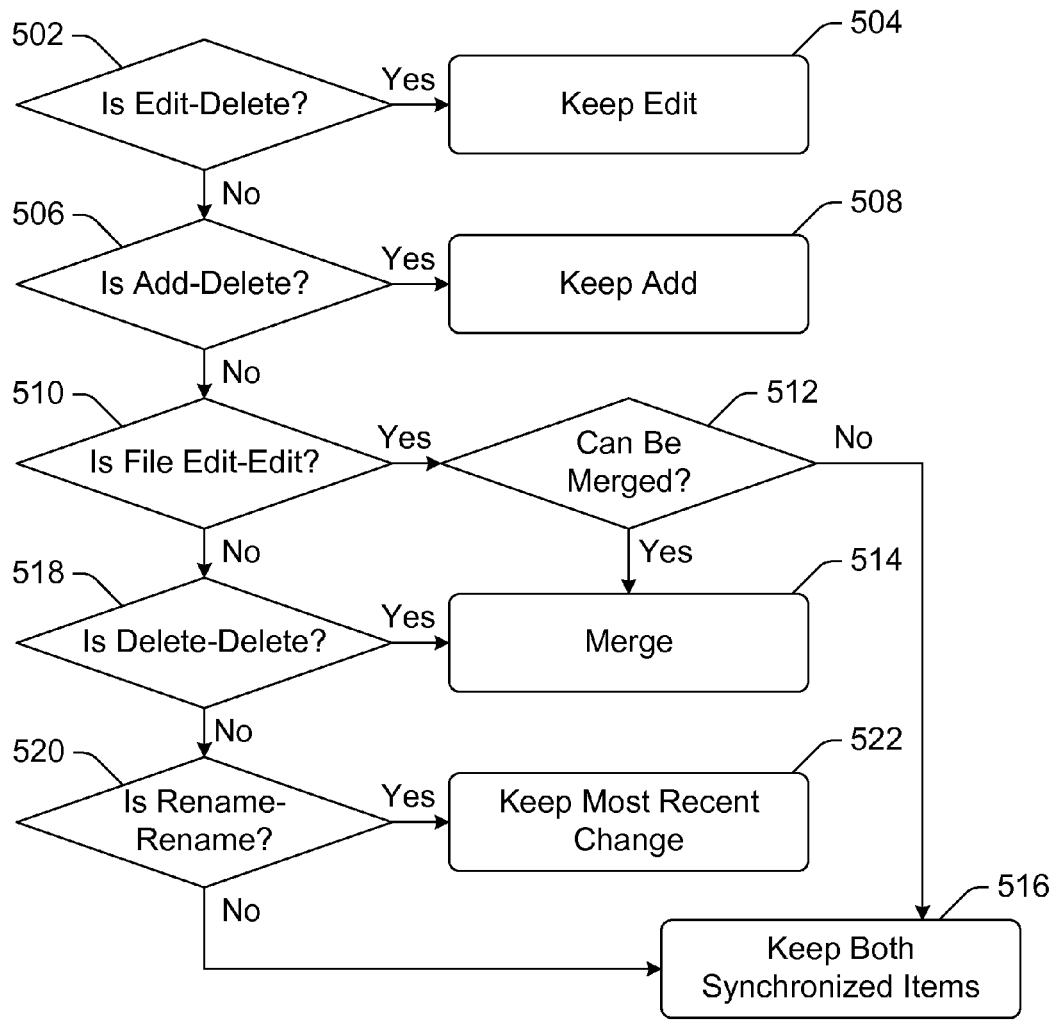
FIG. 5 is a flowchart illustrating an example process for using a set of rules to automatically resolve a synchronization conflict in accordance with one or more embodiments.

FIG. 5 is a flowchart illustrating an example process 500 for using a set of rules to automatically resolve a synchronization conflict in accordance with one or more embodiments. Process 500 is carried out by a device, such as a computing device 102 of FIG. 1, and can be implemented in software, firmware, hardware, or combinations thereof. Process 500 can implement, for example, act 414 of FIG. 4. Process 500 is shown as a set of acts and is not limited to the order shown for performing the operations of the various acts. Process 500 is an example process for using a set of rules to automatically resolve a conflict; additional discussions of using a set of rules to automatically resolve a conflict are included herein with reference to different figures.

In process 500, a check is made as to whether the synchronization conflict is an edit-delete conflict (act 502). An edit-delete conflict is a conflict in which one synchronized item is edited and another synchronized item is deleted. The edit and delete can be for different copies of the same synchronized item, or alternatively one of the edit and delete can be to a particular folder and the other of the edit and delete can be to a file or other folder included in that particular folder.

If the synchronization conflict is an edit-delete conflict, then the synchronization item that is the edit is kept (act 504). The synchronization item that is the delete is ignored and discarded. This result is the application of rule 1 of Table II discussed above.

If the synchronization conflict is not an edit-delete conflict, then a check is made as to whether the synchronization conflict is an add-delete conflict (act 506). An add-delete conflict is a conflict in which one synchronized item is added and another synchronized item is deleted. The add and delete can be for different copies of the same synchronized item, or alternatively one of the add and delete can be to a particular folder and the other of the add and delete can be to a file or other folder included in that particular folder.

If the synchronization conflict is an add-delete conflict, then the synchronization item that is the add is kept (act 508). The synchronization item that is the delete is ignored and discarded. This result is the application of rule 2 of Table II discussed above.

If the synchronization conflict is not an add-delete conflict, then a check is made as to whether the synchronization conflict is an edit-edit conflict (act 510). An edit-edit conflict is a conflict in which two synchronized items are edited. The edits can be for different copies of the same synchronized item, or alternatively one of the edits can be to a particular folder and the other of the edits can be to a file or other folder included in that particular folder.

If the synchronization conflict is an edit-edit conflict, then a check is made as to whether the two synchronization items can be merged (act 512). If the two synchronization items can be merged, then the two synchronization items are merged (act 514). However, if the two synchronization items cannot be merged, then both of the synchronization items are kept (act 516). Acts 514 and 516 are the result of the application of rule 3 of Table II discussed above.

If the synchronization conflict is not an edit-edit conflict, then a check is made as to whether the synchronization conflict is a delete-delete conflict (act 518). A delete-delete conflict is a conflict in which two synchronized items are deleted. The deletes can be for different copies of the same synchronized item, or alternatively one of the deletes can be to a particular folder and the other of the deletes can be to a file or other folder included in that particular folder.

If the synchronization conflict is a delete-delete conflict, then the two synchronization items are merged (act 514). This result is the application of rule 4 of Table II discussed above.

If the synchronization conflict is not a delete-delete conflict, then a check is made as to whether the synchronization conflict is a rename-rename conflict (act 520). A rename-rename conflict is a conflict in which two synchronized items are renamed. The renames can be for different copies of the same synchronized item, or alternatively one of the renames can be to a particular folder and the other of the renames can be to a file or other folder included in that particular folder.

If the synchronization conflict is a rename-rename conflict, then the synchronized item that is the most recent change (e.g., has the most recent timestamp) is kept (act 522). This result is the application of rule 5 of Table II discussed above.

If the synchronization conflict is not a rename-rename conflict, then both versions of the synchronization item are kept (act 516). This result is the application of rule 6 of Table II discussed above.

Figure 6:
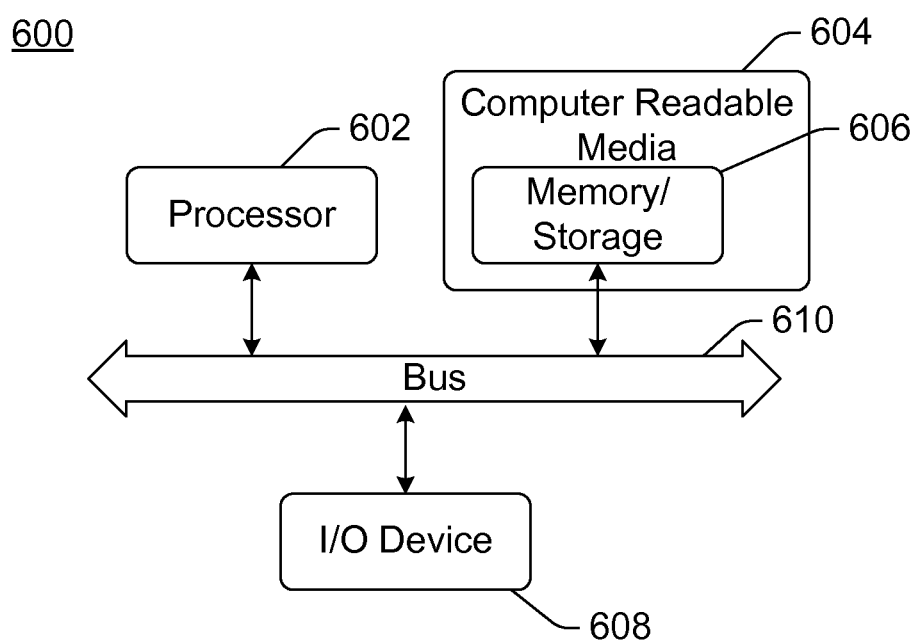
FIG. 6 illustrates an example computing device that can be configured to implement the automatic synchronization conflict resolution in accordance with one or more embodiments.

FIG. 6 illustrates an example computing device 600 that can be configured to implement the automatic synchronization conflict resolution in accordance with one or more embodiments. Computing device 600 can be, for example, any of computing devices 102 of FIG. 1, can be a computing device implementing at least part of synchronization service 104 of FIG. 1.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable media, further description of which may be found with reference to FIG. 6. The features of the automatic synchronization conflict resolution described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device capable of resolving synchronization conflict, the device comprising:
   one or more processors; and
   one or more computer-readable storage media having stored thereon multiple instructions that, when executed by the one or more processors, cause the processors to:
   determine a synchronization conflict exists between a first item of a synchronized document at a first user computing device and a second item of a synchronized document at a second user computing device;
   determine, in response to the synchronization conflict:
   whether the first user computing device has written a token value to become a resolver for the synchronization conflict, and, in response to the first user computing device writing a token value, designating the first user computing device as the resolver for the synchronization conflict, wherein, upon the first computing device being designated as the resolver, the first computing device is permitted to automatically carry out a rule-based conflict resolution that attempts to resolve the determined synchronization conflict without user input, the rule-based conflict resolution being based on, in part, a set of multiple rules; and in response to the first user computing device not writing the token value, designating the second user computing device as the resolver for the synchronization conflict.

2. The device as recited in claim 1, further comprising sending the notification only if the attempt to become the resolver for the synchronization conflict is successful.

3. The device as recited in claim 1, wherein the first computing device attempts to become the resolver for the synchronization conflict at a same time as the second computing device attempts to become the resolver for the synchronization conflict, and only one of the first computing device or the second computing device becomes the resolver for the synchronization conflict.

4. The device as recited in claim 1, further comprising maintaining a record of changes to synchronized items, including the change to the first synchronized item and the change to the second synchronized item, that have been made at the first computing device or at the second computing device.

5. The device as recited in claim 1, wherein the determining further comprises determining there is a synchronization conflict between the change to the first synchronized item and changes to one or more additional synchronized items at one or more additional computing devices, and further comprising performing the rule-based conflict resolution one or more additional times, each time to resolve a synchronization conflict with the change to one of the one or more additional synchronized items.

6. The device as recited in claim 1, wherein the synchronization conflict arises from the change made to the first synchronized item by a first user of the first computing device, and the change made to the second synchronized item by a second user of the second computing device, wherein the first user and the second user are different users.

7. The device as recited in claim 1, wherein the first synchronized item and the second synchronized item comprise different copies of a same file.

8. The device as recited in claim 1, wherein the first synchronized item and the second synchronized item comprise folders.

9. The device as recited in claim 1, wherein one of the first synchronized item and the second synchronized item comprises a file, and the other of the first synchronized item and the second synchronized item comprises a folder.

10. The device as recited in claim 1, wherein the first synchronized item and the second synchronized item comprise different copies of data maintained in a data structure of memory of the first computing device and the second computing device.

11. The device as recited in claim 1, wherein the performing rule-based conflict resolution comprises automatically resolving the synchronization conflict by applying a rule indicating that the first synchronized item and the second synchronized item are to be merged together into one synchronized item.

12. The device as recited in claim 1, wherein the performing rule-based conflict resolution comprises automatically resolving the synchronization conflict by applying a rule indicating that one of the first synchronized item and the second synchronized item is to be kept and that the other of the first synchronized item and the second synchronized item is to be discarded.

13. The device as recited in claim 1, wherein the performing rule-based conflict resolution comprises automatically resolving the synchronization conflict by applying a rule indicating that both the first synchronized item and the second synchronized item are to be kept.

14. A computer system comprising:
a memory and a processor configured to execute instructions in the memory to cause the computer system to implement synchronization conflict resolution, the synchronization conflict resolution configured to:
determine a synchronization conflict exists between a first item of a synchronized document at a first user computing device and a second item of a synchronized document at a second user computing device by determining that there is a synchronization conflict between a change to the first synchronized item and changes to one or more additional synchronized items at one or more additional computing devices of multiple computing devices;
determine, in response to the synchronization conflict:
whether the first user computing device has written a token value to become a resolver for the synchronization conflict, and, in response to the first user computing device writing a token value, designating the first user computing device as the resolver for the synchronization conflict, wherein, upon the first computing device being designated as the resolver, the first computing device is permitted to automatically carry out a rule-based conflict resolution that attempts to resolve the determined synchronization conflict without user input, the rule-based conflict resolution being based on, in part, a set of multiple rules; and
in response to the first user computing device not writing the token value, designating the second user computing device as the resolver for the synchronization conflict.

15. The computer system as recited in claim 14, wherein to perform the rule-based conflict resolution is to:
if the synchronization conflict is an edit-delete conflict, then keep the one of the first and second synchronized items that is an edit and discard the one of the first and second synchronized items that is a delete,
if the synchronization conflict is an add-delete conflict, then keep the one of the first and second synchronized items that is an add and discard the one of the first and second synchronized items that is a delete,
if the synchronization conflict is a file edit-edit conflict, then merge the first and second synchronized items if the first and second synchronized items can be merged, otherwise keep both the first and second synchronized items,
if the synchronization conflict is a delete-delete conflict, then merge the first and second synchronized items,
if the synchronization conflict is a rename-rename conflict, then keep the one of the first and second synchronized items that is a most recent change, and
otherwise keep both the first and second synchronized items.

16. The computer system as recited in claim 14, wherein the instructions further cause the one or more processors to perform the rule-based conflict resolution one or more additional times, each time to resolve a synchronization conflict with the change to one of the one or more additional synchronized items.

17. The computer system as recited in claim 14, wherein to perform rule-based conflict resolution is to automatically resolve the synchronization conflict by applying a rule indicating that the first synchronized item and the second synchronized item are to be merged together into one synchronized item.

18. The computer system as recited in claim 14, wherein to perform rule-based conflict resolution is to automatically resolve the synchronization conflict by applying a rule indicating that one of the first synchronized item and the second synchronized item is to be kept and that the other of the first synchronized item and the second synchronized item is to be discarded.

19. The computer system as recited in claim 14, wherein to perform rule-based conflict resolution is to automatically resolve the synchronization conflict by applying a rule indicating that both the first synchronized item and the second synchronized item are to be kept.

20. A device capable of resolving synchronization conflict, the device comprising:
- one or more processors; and
- one or more computer-readable storage media having stored thereon multiple instructions that, when executed by the one or more processors, cause the processors to:
  - identify at a first computing device, via network communications with a remote synchronization service, a second user computing device;
  - determine there is a synchronization conflict between a change to a first synchronized item at the first user computing device and a change to a second synchronized item at the second user computing device;
  - determine, in response to the synchronization conflict:
    - whether the first computing device has written a token value in order to become a resolver for the conflict, and
    - in response to the first computing device writing a token value, selecting the first computing device to be the resolver for the conflict; and
  - in response to the first computing device not writing the token value, not selecting the first computing device sufficient to enable the second computing device to become the resolver for the conflict;
  - responsive to the first computing device being selected as the resolver, performing, by the first computing device as the resolver, rule-based conflict resolution, based on a rules arranged in hierarchy, to automatically resolve the synchronization conflict, including:
    - if the synchronization conflict is an edit-delete conflict, then keeping the one of the first and second synchronized items that is an edit and discarding the one of the first and second synchronized items that is a delete,
    - if the synchronization conflict is an add-delete conflict, then keeping the one of the first and second synchronized items that is an add and discarding the one of the first and second synchronized items that is a delete,
    - if the synchronization conflict is a file edit-edit conflict, then merging the first and second synchronized items if the first and second synchronized items can be merged, otherwise keeping both the first and second synchronized items,
    - if the synchronization conflict is a delete-delete conflict, then merging the first and second synchronized items,
    - if the synchronization conflict is a rename-rename conflict, then keeping the one of the first and second synchronized items that is a most recent change, and
  - otherwise keeping both the first and second synchronized items.

\* \* \* \* \*